US008991451B2

(12) United States Patent
Itoh

(10) Patent No.: US 8,991,451 B2
(45) Date of Patent: Mar. 31, 2015

(54) PNEUMATIC TIRE WITH TREAD HAVING RIBS, OPEN SIPES AND MULTISIPES

(75) Inventor: Takanori Itoh, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 957 days.

(21) Appl. No.: 12/306,338

(22) PCT Filed: Jun. 12, 2007

(86) PCT No.: PCT/JP2007/061823
§ 371 (c)(1),
(2), (4) Date: Dec. 23, 2008

(87) PCT Pub. No.: WO2007/148564
PCT Pub. Date: Dec. 27, 2007

(65) Prior Publication Data
US 2009/0283188 A1    Nov. 19, 2009

(30) Foreign Application Priority Data

Jun. 23, 2006    (JP) .................................. 2006-174444

(51) Int. Cl.
*B60C 11/12*     (2006.01)
*B60C 11/03*     (2006.01)
*B60C 11/04*     (2006.01)

(52) U.S. Cl.
CPC ..... *B60C 11/0309* (2013.01); *B60C 2011/1213* (2013.01); *B60C 2011/1209* (2013.01);
(Continued)

(58) Field of Classification Search
CPC .................. B60C 11/045; B60C 11/12; B60C 2011/1209; B60C 2011/1213; B60C 2011/1227

USPC .......... 152/209.18, 209.21, 209.24, 900, 901, 152/DIG. 3

See application file for complete search history.

(56) References Cited

U.S. PATENT DOCUMENTS 4,856,571 A * 8/1989 Collette et al. ........... 152/DIG. 3
4,945,966 A   8/1990 Ogawa
(Continued)

FOREIGN PATENT DOCUMENTS

EP    348335 A2 * 12/1989
JP    61-159203    10/1986
(Continued)

OTHER PUBLICATIONS

Machine translation for Korea 2005-0116308 (no date).*
(Continued)

*Primary Examiner* — Steven D Maki
(74) *Attorney, Agent, or Firm* — Greer Burns & Crain, Ltd.

(57) ABSTRACT

A pneumatic tire includes a tread portion; a plurality of main grooves extending in a tire circumferential direction on the tread portion; at least four ribs sectioned by the main grooves on the tread portion; a plurality of open sipes, each formed across both edge portions of the rib, the open sipes being formed on each of the ribs; and a plurality of multisipes, each formed on one of the edge portions of the rib. The multisipes are formed on only each of the ribs between which an outer main groove is positioned, and are aligned along the edge portion of the rib. The outer main groove is a main groove in an outermost position in a tire width direction out of the main grooves.

8 Claims, 4 Drawing Sheets

(52) U.S. Cl.
CPC ....... *B60C2011/1227* (2013.01); *B60C 11/042* (2013.01); *B60C 11/12* (2013.01); *B60C 2200/06* (2013.01); *B60C 11/045* (2013.01)
USPC .................................................. 152/209.18

(56) References Cited

U.S. PATENT DOCUMENTS

| | | | | |
|---|---|---|---|---|
| 5,109,904 | A | * | 5/1992 | Numata et al. ............ 152/DIG. 3 |
| 5,896,905 | A | * | 4/1999 | Lurois ....................... 152/DIG. 3 |
| 6,196,288 | B1 | * | 3/2001 | Radulescu et al. ........ 152/DIG. 3 |
| 2007/0284026 | A1 | * | 12/2007 | Suzuki ...................... 152/209.18 |

FOREIGN PATENT DOCUMENTS

| | | | |
|---|---|---|---|
| JP | 63-106110 | | 5/1988 |
| JP | 63-91905 | | 6/1988 |
| JP | 63-291705 A | * | 11/1988 |
| JP | 04-230407 | | 8/1992 |
| JP | 05-345505 | | 12/1993 |
| JP | 06-239109 A | * | 8/1994 |
| JP | 7-215014 | | 8/1995 |
| JP | 08-150812 | | 6/1996 |
| JP | 09-011708 A | * | 1/1997 |
| JP | 2002-103922 | | 4/2002 |
| JP | 2002-362115 | | 12/2002 |
| KR | 2005-0116308 A | * | 12/2005 |

OTHER PUBLICATIONS

Machine translation for Japan 09-011708 (no date).*
machine translation for Japan 07-215014 (no date).*
machine translation for Japan 06-239109 (no date).*

* cited by examiner

FIG.6

| | CONVENTIONAL EX. | COMPARATIVE EX.1 | COMPARATIVE EX.2 | COMPARATIVE EX.3 | COMPARATIVE EX.4 | COMPARATIVE EX.5 | COMPARATIVE EX.6 | COMPARATIVE EX.7 | INVENTION EX.1 | INVENTION EX.2 | INVENTION EX.3 | INVENTION EX.4 | INVENTION EX.5 | INVENTION EX.6 | INVENTION EX.7 |
|---|---|---|---|---|---|---|---|---|---|---|---|---|---|---|---|
| WITH OR WITHOUT OPEN SIPE (CENTER / SHOULDER RIB) | YES/NO | NO/NO/NO | NO/NO/NO | YES/NO | YES/YES | YES/NO | YES/NO | YES/NO | YES/YES | YES/YES | YES/YES | YES/YES | YES/YES | YES/YES | YES/YES |
| OBLIQUE ANGLE θ OF OPEN SIPE [deg] | 30 | - | - | 80 | 30 | 30 | 30 | 30 | 50 | 70 | 50 | 50 | 70 | 60 | 60 |
| OBLIQUE ANGLE φ OF OPEN SIPE [deg] | 0 | - | - | 20 | 90 | 0 | 0 | 0 | 30 | 30 | 40 | 40 | 40 | 50 | 50 |
| WITH OR WITHOUT MULTISIPE (INNER / OUTER MAIN GROOVE) | NO/YES | YES/YES | NO/YES | NO/YES | YES/YES | NO/YES | NO/YES | NO/YES | NO/YES | NO/YES | NO/YES | NO/YES | NO/YES | NO/YES | NO/YES |
| LENGTH sl OF MULTISIPE | 4.5 | 5.0 | 3.0 | 4.0 | 4.5 | 2 | 7 | 4.5 | 3.5 | 3.5 | 4.0 | 5.0 | 5.0 | 6.0 | 4.5 |
| PITCH sp BETWEEN MULTISIPES | 3.3 | 4.0 | 7.0 | 6.0 | 5.0 | 3.3 | 3.3 | 8 | 5.5 | 5.5 | 6.5 | 6.0 | 6.5 | 6.0 | 6.0 |
| WET PERFORMANCE | 100 | 90 | 90 | 95 | 100 | 100 | 100 | 100 | 110 | 110 | 110 | 110 | 110 | 110 | 110 |
| UNEVEN WEAR RESISTANCE OF CENTER RIB | 100 | 95 | 100 | 100 | 95 | 100 | 100 | 100 | 100 | 100 | 100 | 100 | 100 | 100 | 100 |
| UNEVEN WEAR RESISTANCE OF SHOULDER RIB | 100 | 100 | 95 | 100 | 100 | 90 | 100 | 100 | 100 | 100 | 100 | 100 | 100 | 100 | 100 |
| SIPE TEARING-OFF RESISTANCE | 100 | 90 | 115 | 110 | 105 | 100 | 90 | 90 | 110 | 110 | 110 | 110 | 110 | 110 | 110 |

PNEUMATIC TIRE WITH TREAD HAVING RIBS, OPEN SIPES AND MULTISIPES

TECHNICAL FIELD

The present invention relates to a pneumatic tire, and more specifically, to a pneumatic tire with improved wet performance in which uneven wear resistance of the tire is maintained.

BACKGROUND ART

There has been a demand for improvement in wet resistance and uneven wear resistance of heavy duty pneumatic tires. To satisfy the demand, approaches for improving the above performance have been made in recent years by forming various types of sipes on ribs.

As a conventional pneumatic tire employing the above configuration, a technology disclosed in Patent Document 1 is known. The conventional pneumatic tire (pneumatic tire for vehicles for driving on the left) has a plurality of ribs on a tread. The ribs are sectioned by a plurality of circumferential direction main grooves extending in the circumferential direction of the tire. On at least one of the ribs, a plurality of sipes extending across the rib is formed. All the sipes extend right upwardly and are oblique to the tire axial direction.

Patent Document 1: Japanese Patent Application Laid-open No. 2002-103922

DISCLOSURE OF INVENTION

Problem to be Solved by the Invention

The present invention relates to a pneumatic tire with improved wet performance in which uneven wear resistance of the tire is maintained.

Means for Solving Problem

A pneumatic tire according to an aspect of the present invention includes a tread portion; a plurality of main grooves extending in a tire circumferential direction on the tread portion; at least four ribs sectioned by the main grooves on the tread portion; a plurality of open sipes, each formed across both edge portions of the rib, the open sipes being formed on each of the ribs; and a plurality of multisipes, each formed on one of the edge portions of the rib. The multisipes are formed on only each of the ribs between which an outer main groove is positioned, and are aligned along the edge portion of the rib. The outer main groove is a main groove in an outermost position in a tire width direction out of the main grooves.

In the pneumatic tire, the open sipes are formed on each rib, which increases the edge performance of each rib. This advantageously improves the wet performance of the tire. In addition, because the multisipes are aligned along the edge portion of the rib, the rigidity of the edge portion of the rib decreases, which achieves equal contact pressures. This prevents uneven wear of the ribs, which advantageously improves the uneven wear resistance of the tire.

Effect of the Invention

In the pneumatic tire according to the present invention, the open sipes are formed on each rib, which increases the edge performance of each rib. This advantageously improves the wet performance of the tire. In addition, because the multisipes are aligned along the edge portion of the rib, the rigidity of the edge portion of the rib decreases, which achieves equal contact pressures. This prevents uneven wear of the ribs, which advantageously improves the uneven wear resistance of the tire.

BRIEF DESCRIPTION OF DRAWINGS

FIG. 6 is a table of results of performance tests on pneumatic tire according to the embodiment of the present invention.

EXPLANATIONS OF LETTERS OR NUMERALS

Figure 1:
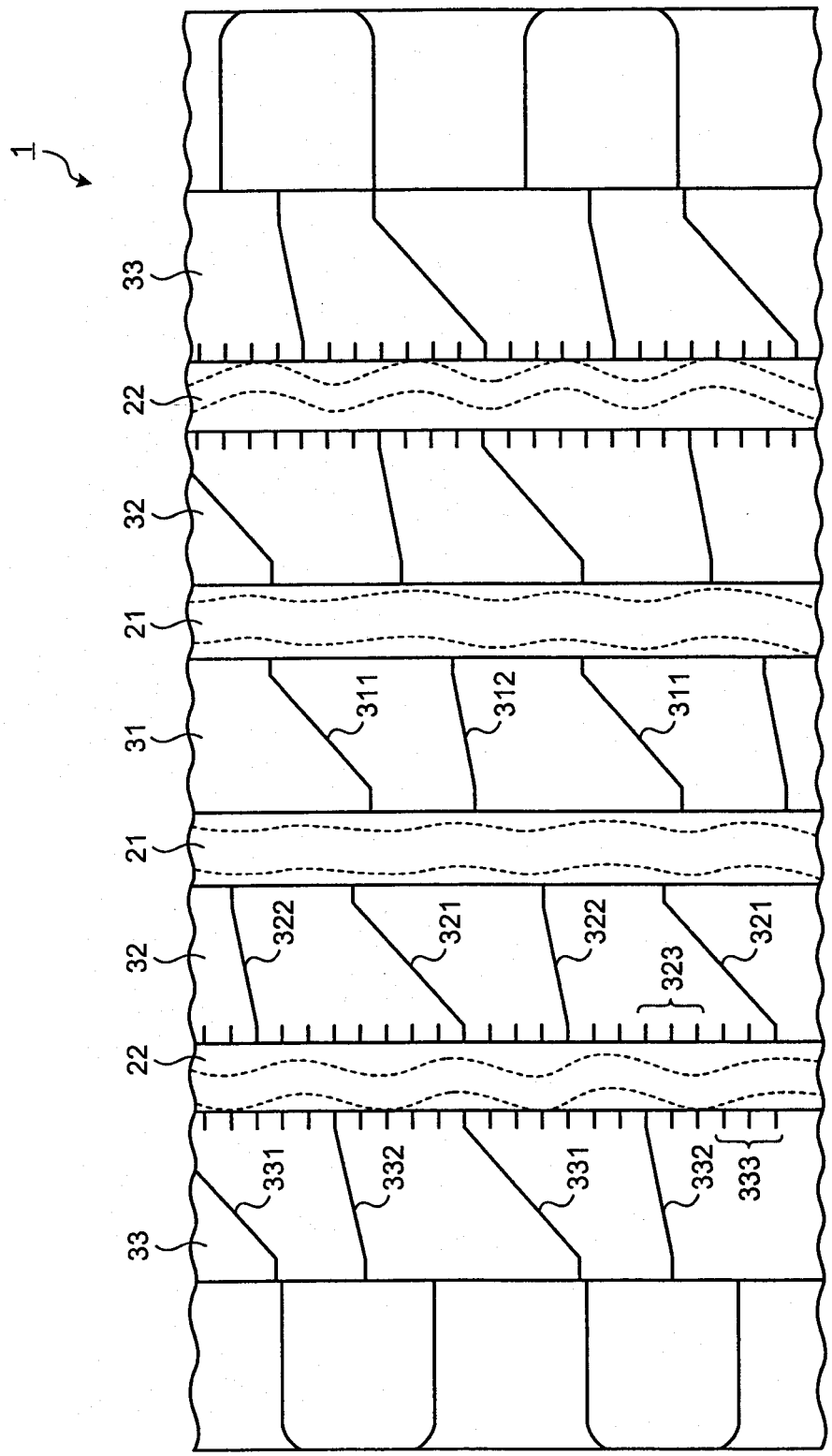
FIG. 1 is a plan view of a tread portion of a pneumatic tire according to an embodiment of the present invention.

1 Pneumatic tire
21 Inner main groove
22 Outer main groove
31 Center rib
32 Second rib
33 Shoulder rib
311, 312, 321, 322, 331, 332 Open sipe
323, 333 Multisipe

BEST MODE(S) FOR CARRYING OUT THE INVENTION

Exemplary embodiments of the present invention are explained in detail below with reference to the accompanying drawings. The present invention is not limited to the embodiments. The constituents of the embodiments include constituents that can be easily replaced by those skilled in the art and constituents substantially same as the constituents of the embodiments. The modified examples described in the embodiments can be arbitrarily combined within the scope obvious to those skilled in the art.

Embodiment

Figure 2:
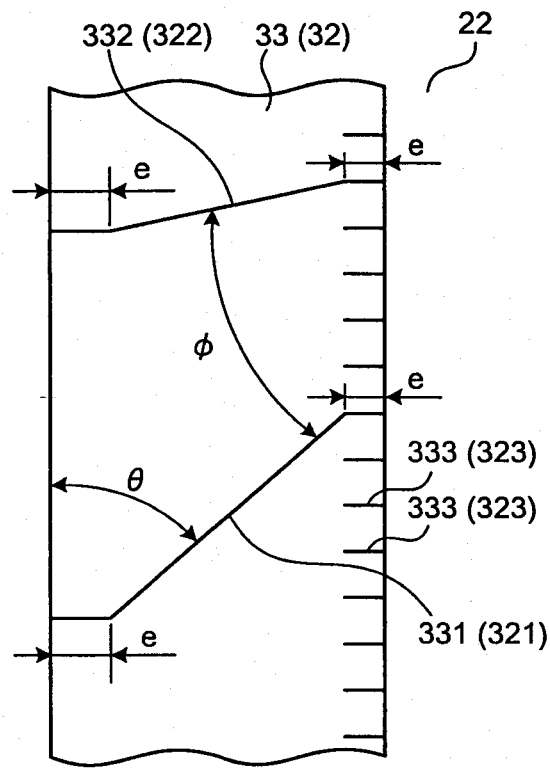
FIG. 2 is an enlarged view of a rib of the pneumatic tire shown in FIG. 1.
Figure 3:
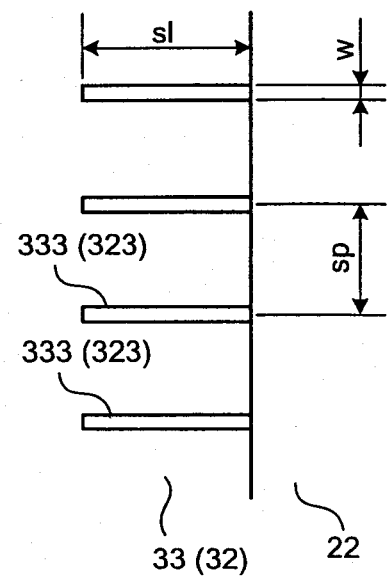
FIG. 3 is an explanatory view of multisipes of the rib shown in FIG. 1.
Figure 4:
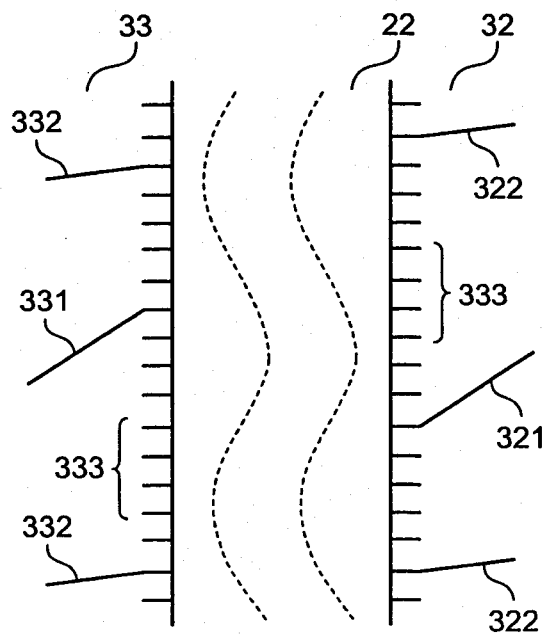
FIG. 4 is a plan view of a main groove of the pneumatic tire shown in FIG. 1.
Figure 5:
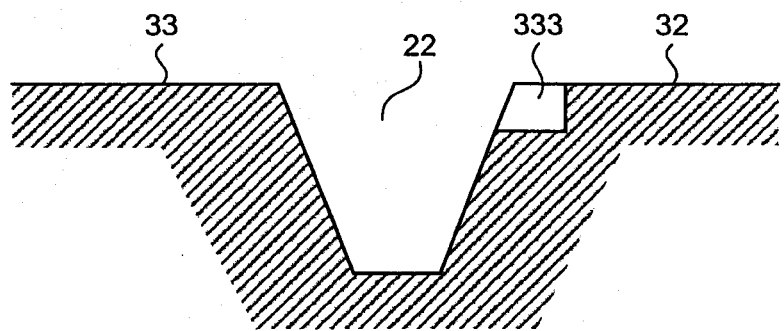
FIG. 5 is a cross sectional view of the main groove of the pneumatic tire shown in FIG. 1.

FIG. 1 is a plan view of a tread portion of a pneumatic tire according to an embodiment of the present invention. FIG. 2 is an enlarged view of a rib of the pneumatic tire shown in FIG. 1. FIG. 3 is an explanatory view of multisipes of the rib shown in FIG. 1. FIGS. 4 and 5 are respectively a plan view (FIG. 4) and a cross sectional view (FIG. 5) of a main groove of the pneumatic tire shown in FIG. 1. FIG. 6 is a table of results of performance tests on the pneumatic tire according to the embodiment of the present invention.

A pneumatic tire 1 is applied to, for example, a heavy duty radial tire. A tread portion of the pneumatic tire 1 includes a plurality of main grooves 21 and 22 extending in a tire circumferential direction and a plurality of ribs 31 to 33 sectioned by the main grooves 21 and 22 (see FIG. 1). In the embodiment, a rib pattern of four main grooves 21 and 22 and five ribs 31 to 33 is formed on the tread portion.

The main grooves 22 in the outermost positions in a tire width direction out of the main grooves 21 and 22 are referred to as outer main grooves and the main grooves 21 are referred to as inner main grooves. The ribs 31 and 32 on an inner side in the tire width direction with respect to the outer main grooves 22 are referred to as inner ribs (the center rib 31 and the second ribs 32). The ribs 33 on an outer side in the tire width direction with respect to the outer main grooves 22 are referred to as shoulder ribs 33.

On the ribs 31 to 33, a plurality of sipes 311 to 333 are formed. Out of the sipes 311 to 333, the sipes 311, 312, 321, 322, 331, and 332 that are formed across edge portions on both sides of the ribs 31 to 33 are referred to as open sipes. The sipes 323 and 333 respectively formed on the edge portions on one side of the ribs 32 and 33 are referred to as multisipes (one-side open sipe).

In the pneumatic tire 1, the open sipes 311, 312, 321, 322, 331, and 332 are formed on the ribs 31 to 33. The multisipes 323 and 333 are formed on the ribs 32 and 33 between which the outer main groove 22 is positioned. The multisipes 323 and 333 are aligned on the edge portions of the ribs 32 and 33 on the side of the outer main groove 22 in a groove length direction. Specifically, the multisipes 332 and 333 are formed along the edge portion of the second rib 32 on the side of the outer main groove 22 and the edge portion of the shoulder rib 33 on the side of the outer main groove 22. The multisipes 323 and 333 are formed along only the outer main grooves 22 (a tread portion shoulder area) and are not formed along the inner main 25 groove 21 (a tread portion center area).

In the above configuration, the open sipes 311 to 332 are formed on the ribs 31 and 33. The open sipes 311 to 332 increase the edge performance of the ribs 31 to 33. This advantageously improves the wet performance of the tire. Because the multisipes 323 and 333 are aligned along the edge portions of the ribs 32 and 33, the rigidity of the edge portions of the ribs 32 and 33 decreases, which achieves equal contact pressures. This prevents uneven wear of the ribs 32 and 33, which advantageously improves the uneven wear resistance of the tire.

The multisipes are formed along only the outer main grooves 22 and not formed along the inner main grooves 21. This prevents cracks from occurring along the inner main grooves 21, which advantageously improves the sipe tearing-off resistance of the tire. A higher contact pressure is caused in the tread portion center area while the tire is in contact with the road surface. For this reason, when the multisipes are formed along the inner main grooves 21, cracks are easily caused on edge portions of the multisipes along with stop/go operations for a large number of times.

Additional Note 1

In the pneumatic tire 1, it is preferable that the open sipes 321, 322, 331, and 332 be oblique to the tire circumferential direction (see FIGS. 1 and 2). In other words, it is preferable that each of the ribs 32 and 33 have at least one portion in which the open sipes 321, 322, 331, and 332 are oblique to the tire circumferential direction. This increases the edge performance of the ribs 32 and 33, which advantageously improves the wet performance of the tire. In the embodiment, the open sipes 321 to 332 are oblique to the tire circumferential direction in center portions of the ribs 32 and 33.

In the above configuration, it is preferable that the open sipes 321 and 322 (331 and 332) adjacent to each other and formed on the rib 32 (33) respectively have different oblique angles to the tire circumferential direction (see FIG. 2). For example, the open sipes 331 and 332 are formed on the shoulder rib 33 such that all the open sipes 331 and 332 are oblique in its lengthwise direction to the tire circumferential direction. In this configuration, the oblique angles of the open sipes 321 and 322 (331 and 332) are different from each other. Therefore, the edge performance in different directions can be achieved while the tire is in contact with the ground. This advantageously improves the wet performance of the tire.

In the above configuration, the open sipe 321 (331) of the adjacent open sipes 321 and 322 (331 and 332) is oblique to the tire circumferential direction at an oblique angle $\theta$ and the open sipe 322 (332) is oblique to the open sipe 321 (331) at a relative oblique angle of $\phi$ (see FIG. 2). It is preferable that the oblique angle $\theta$ be within the range of 50 [deg]$\leq\theta\leq$70 [deg] and the oblique angle $\phi$ (be within the range of 30 [deg]$\leq\phi\leq$50 [deg].

In the above configuration, the oblique angles $\theta$ and $\phi$ (of the open sipes 321 and 322 (331 and 332) are optimized. Therefore, a cutoff of the rib 32 (33) is prevented, and the edge performance of the rib 32 (33) increases. This advantageously improves the durability and wet resistance of the tire. For example, when each of the adjacent open sipes 321 and 322 (331 and 332) in a pair has the oblique angle $\theta$ satisfying $\theta$<50 [deg] with respect to the tire circumferential direction, the rigidity of portions surrounded by the open sipes 321 and 322 (331 and 332) decreases, which may cause a cutoff of the rib 32 (33). When the oblique angle $\theta$ satisfies $\theta$<70 [deg], the edge performance of the rib 32 (33) with respect to the tire circumferential direction decreases, which reduces the wet performance of the tire. When the relative oblique angle $\phi$ between the open sipes 321 and 322 (331 and 332) satisfies $\phi$<30 [deg] or 50 [deg]<$\phi$, the edge performance of the rib 32 (33) with respect to various directions from which a pressure is applied decreases, which reduces the wet performance of the tire.

In the above configuration, it is preferable that the open sipes 321 and 322 (331 and 332) formed on the rib 32 (33) do not intersect with each other (see FIG. 2). In other words, it is preferable that the rib is not sectioned into a large number of parts by the open sipes. In the configuration, the rigidity of the rib 32 (33) is secured, which reduces uneven wear of the rib 32 (33). This advantageously improves the uneven wear resistance of the tire.

Additional Note 2

In the pneumatic tire 1, it is preferable that the end portions of the open sipes 321 and 322 (331 and 332) be approximately orthogonal to the edge portions of the ribs 32 and 33 (see FIG. 2). For example, on the second rib 32 and the shoulder rib 33, the end portions of the open sipes 321, 322, 331, and 332 and the multisipes 332 and 333 are aligned to be orthogonal to the edge portions of the ribs 32 and 33 aligned in the tire circumferential direction in regular intervals (a pitch sp). In this configuration, the rigidity of the edge portions of the ribs 32 and 33 is equalized, which prevents uneven wear of the edge portions. This advantageously improves the uneven wear resistance of the tire.

In the above configuration, it is preferable that the lengths of the orthogonal portions of the end portions of the open sipes 321 and 322 (331 and 332) be approximately equal to lengths sl of the multisipes 323 and 333 (see FIGS. 2 and 3). Specifically, the lengths of the orthogonal portions of the end portions of the open sipes 321 and 322 (331 and 332) are set to 10 [mm] or smaller. In this configuration, the rigidity of the edge portions of the ribs 32 and 33 is further equalized, which prevents uneven wear of the edge portions more effectively. This advantageously further improves the uneven wear resistance of the tire.

Additional Note 3

In the pneumatic tire 1, it is preferable that widths w of the multisipes 323 and 333 are approximately equal to each other (see FIG. 3). This advantageously improves the uneven wear resistance of the tire. For example, when the widths of the multisipes are different from each other, the rigidity of the ribs is unequal, which causes uneven wear.

In the above configuration, it is preferable that lengths sl of the multisipes 323 and 333 be within the range of 3.0 [mm]≤sl≤6.0 [mm], and more preferably, within the range of 4.0 [mm]≤sl≤5.0 [mm] (see FIG. 3). In this configuration, the lengths sl of the multisipes 323 and 333 are optimized, which prevents uneven wear of the ribs 32 and 33 and tearing off (a sipe tearing-off) of the portions in which the multisipes 323 and 333 are formed. This advantageously improves the uneven wear resistance and the sipe tearing-off resistance of the tire. For example, when the length sl satisfies sl<3.0 [mm], the rigidity of the ribs is excessively high, which causes uneven wear of the ribs. When the length sl satisfy 6.0 [mm]<sl, the rigidity of the ribs decreases, which causes a sipe tearing-off.

In the above configuration, it is preferable that the pitch sp between the multisipes 323 and 333 is within the range of 4.5 [mm]≤sp≤7.5 [mm], and more preferably, within the range of 5.0 [mm]≤sp≤6.0 [mm] (see FIG. 3). In this configuration, the interval sp between the multisipes 323 and 333 are optimized, which prevents tearing off of the multisipes 323 and 333 (sipe tering-off) and uneven wear of the ribs 32 and 33 in the positions where the multisipes 323 and 333 are formed. This advantageously improves the sipe tearing-off resistance and uneven wear resistance of the tire. For example, when the interval sp satisfies sp<3.5 [mm], the rigidity of the ribs decreases, which leads to the sipe tearing-off. When the interval sp satisfies 7.5 [mm]<sp, the rigidity of the ribs are excessively high, which leads to uneven wear of the ribs.

Additional note 4

In the pneumatic tire 1, it is preferable that each of the groove walls of the main grooves 21 and 22 have convex portions aligned in a groove lengthwise direction, and that the open sipes 311 to 332 be formed on the groove walls of the main grooves 21 and 22 in a position other than those of top portions (the outermost portion) of the convex portions (see FIGS. 4 and 5). For example, each of the groove walls of the main grooves 21 and 22 extends linearly in the tire circumferential direction in a groove top portion and meanders or zigzags in the tire circumferential direction in a groove bottom portion. In this configuration, the convex portions are formed in the tire circumferential direction (regularly) on each of the groove walls (groove bottoms) of the main grooves 21 and 22. In the plan view of the tread portion, the open sipes 311 to 332 are formed in the positions other than the top portions of the convex portions.

In the above configuration, each of the groove walls of the main grooves 21 and 22 has the convex portions formed in the groove lengthwise direction, which improves the drainage performance of the main grooves 21 and 22. This advantageously improves the wet performance of the tire. In the convex portions of the groove walls, rib tear easily occurs due to stress concentration. However, in the above configuration, because the open sipes 311 to 332 are formed in the positions other than the top portions of the convex portions of the groove walls, the rigidity of the ribs 31 to 33 in the convex portions of the groove walls is ensured (the stress concentration is moderated). This advantageously prevents rib tear.

In the above configuration, it is preferable that each of the groove bottoms of the main grooves 21 and 22 has a smoothly meandering shape (see FIG. 4). In this configuration, the smooth top portions of the convex portions of the groove walls are formed, which moderates the stress concentration in the convex portions of the groove walls. This advantageously further prevents rib tear.

In the above configuration, it is preferable that the convex degrees of convex portions of the respective main grooves 21 and 22 gradually increase from the groove top portions of the main grooves 21 and 22 to the groove bottom portions (see FIGS. 4 and 5). For example, the main grooves 21 and 22 are formed such that the groove widths decrease from the groove top portions of the main grooves 21 and 22 to the groove bottom portions. In this configuration, in the cross section in the groove depth direction of the main grooves 21 and 22 (see FIG. 5), each of the edge angles of edge portions of the ribs 31 to 33 is an obtuse angle, which increases the rigidity of the edge portions of the ribs 31 to 33. This advantageously prevents a sipe tearing-off in the positions where the open sipes 311 to 332 and the multisipes 323 and 333 are formed.

Performance Test

In this example, a plurality of types of pneumatic tires under different conditions underwent performance tests for (1) wet performance, (2) uneven wear resistance, and (3) sipe tearing-off resistance (see FIG. 6). In each performance test, a pneumatic tire in a tire size of 11R22.5 is mounted on an applicable rim defined by the JATMA.

(1) In the performance test for wet performance, each pneumatic tire is applied with an internal pressure of 700 [kpa] and a load of 26.72 [kN]. A test vehicle in which the pneumatic tires are installed travels on the surface of a water-sprinkled asphalt road at an initial speed of 40 [km/h], and a braking distance at braking is measured. Index evaluation using Conventional example as a reference (100) is carried out based on the result of the measurement. In the evaluation, the larger the value is, the more it is preferable.

(2) In the performance test for uneven wear resistance, each pneumatic tire is applied with the maximum load and the maximum air pressure defined by the JATMA. A test vehicle in which the pneumatic tires are installed travels a course of 99% of paved road and 1% of unpaved road for 30,000 [km]. After the traveling, whether uneven wear occurs is observed with naked eyes, and the number of tires in which uneven wear occurs is counted. In the evaluation, the larger the value is, the more it is preferable.

(3) In the performance test for sipe tearing-off resistance, the number of tires in which a sipe tearing-off occurs in (2) the performance test for the uneven wear resistance after the traveling is counted. Index evaluation using Conventional example as a reference (100) is carried out based on the result of the counting.

In the pneumatic tire of Conventional example, only a center rib (and a second rib) has a plurality of open sipes and a shoulder rib does not have open sipes. The open sipes are arranged in parallel in one rib. The multisipes are formed along an outer main groove and not formed along an inner main groove. In the pneumatic tires 1 of Invention Examples 1 to 7, each of the ribs (the center rib, the second ribs, and the shoulder ribs) has a plurality of open sipes. Adjacent open sipes in a pair formed on a single rib are positioned at different oblique angles to the tire circumferential direction. Multisipes are formed along outer main grooves and not formed along inner main grooves.

As the test results indicate, it is found that, in the pneumatic tires 1 of Invention examples 1 to 7, the uneven wear resistance of the tire is maintained and the wet performance improves compared with the pneumatic tire of Conventional example. It is also found that the sipe tearing-off resistance of the tire improves.

From the comparison of Invention example 1 to Comparative examples 1 to 3, it is found that the wet performance of the tire is improved by forming a plurality of open sipes in each rib. From the comparison of Invention examples 1 to 7 to Comparative examples 3 and 4, it is found that the tire wet performance is improved by optimizing the oblique angles θ and φ of the open sipes 311 to 332. From the comparison of Invention examples 1 to 7 to Comparative examples 5 to 7, it is found that the ripe tearing off sipe tearing-off resistance is improved by optimizing the lengths s1 of the multisipes and the pitch sp between the multisipes.

INDUSTRIAL APPLICABILITY

As described above, the pneumatic tire according to the present invention is advantageous in that the uneven wear resistance of the tire is maintained and the wet performance of the tire can be improved.

The invention claimed is:

1. A pneumatic tire comprising:
   a tread portion;
   a plurality of main grooves extending in a tire circumferential direction on the tread portion, wherein two of said main grooves that are located in outermost positions in a tire width direction are defined as outer main grooves,
   at least four ribs sectioned by the main grooves on the tread portion;
   a plurality of open sipes, each formed across both edge portions of the rib, the open sipes being formed on each of the ribs; and
   a plurality of multisipes, each formed on one of the edge portions of the rib, the multisipes being formed on only each of the ribs between which the outer main grooves are positioned,
   the multisipes being aligned along the edge portion of the rib,
   wherein center positions of the open sipes are oblique to the tire circumferential direction,
   wherein the center portion of one of the open sipes in a pair adjacent to each other formed on the same rib is oblique to the tire circumferential direction at an oblique angle θ, and an angle formed by the open sipe oblique to the tire circumferential direction at the oblique angle θ and the center portion of the other open sipe of the open sipes is a relative angle φ,
   wherein the oblique angle θ is within a range of 50°≤θ≤70° and the oblique angle φ is within a range of 30°≤φ≤50°, and
   wherein end portions of the open sipes are orthogonal to the edge portion of the rib.

2. The pneumatic tire according to claim 1, wherein the open sipes formed on the rib do not intersect with each other.

3. The pneumatic tire according to claim 1, wherein a length of an orthogonal portion of the end portions of the open sipes are approximately equal to a length "s1" of the multisipes.

4. The pneumatic tire according to claim 1, wherein widths "w" of the multisipes are approximately equal to each other.

5. The pneumatic tire according to any one of claims 1, 2, 3 or 4, wherein the length "s1" of each of the multisipes is within a range of 3.0 mm≤s1≤6.0 mm.

6. The pneumatic tire according to claim 1, wherein a pitch "sp" between the multisipes is within a range of 14.5 mm≤sp≤7.5 mm.

7. The pneumatic tire according to claim 1, wherein:
   a groove wall of each of the main grooves has a convex portion formed in a groove lengthwise direction, and
   each of the open sipes is formed in each of the main grooves in a position other than a position of a top portion of the convex portion.

8. The pneumatic tire according to claim 7, wherein a convex degree of a convex portion of each of the main groove-grooves gradually increases from a groove top portion to a groove bottom portion.

* * * * *